United States Patent
Yoshikawa

(10) Patent No.: US 8,203,312 B2
(45) Date of Patent: Jun. 19, 2012

(54) BATTERY PACK AND CONTROL METHOD

(75) Inventor: Yasuo Yoshikawa, Fukushima (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 12/428,086

(22) Filed: Apr. 22, 2009

(65) Prior Publication Data

US 2009/0273314 A1    Nov. 5, 2009

(30) Foreign Application Priority Data

May 2, 2008  (JP) ................................. 2008-120107

(51) Int. Cl.
| | |
|---|---|
| H02J 7/00 | (2006.01) |
| H02H 3/00 | (2006.01) |
| H01H 85/00 | (2006.01) |
| H02J 7/04 | (2006.01) |
| H02J 7/16 | (2006.01) |
| G01N 27/27 | (2006.01) |
| G08B 21/00 | (2006.01) |

(52) U.S. Cl. ........ 320/136; 320/106; 320/112; 320/135; 320/149; 320/155; 361/98; 361/104; 324/426; 324/550; 340/636.1; 340/636.21; 363/56.03; 363/56.05

(58) Field of Classification Search .................. 320/135, 320/136, 106, 112, 149, 155; 324/426, 550; 340/636.1, 636.21; 361/98, 104; 363/56.03, 363/56.05
See application file for complete search history.

(56) References Cited

U.S. PATENT DOCUMENTS 6,577,105 B1 *   6/2003   Iwaizono .................... 320/134
2007/0105010 A1*  5/2007  Cassidy .......................... 429/90
2007/0188141 A1*  8/2007  Hamaguchi et al. .......... 320/128
2007/0188148 A1*  8/2007  Kawasumi et al. ........... 320/134
2007/0229026 A1* 10/2007  Morioka et al. .............. 320/112

FOREIGN PATENT DOCUMENTS

| JP | 10-322880 | 12/1998 |
|---|---|---|
| JP | 2000-340267 | 12/2000 |
| JP | 2000-357540 | 12/2000 |
| JP | 2003-109673 | 4/2003 |
| JP | 2007-215310 | 8/2007 |
| JP | 2008-060000 | 3/2008 |

OTHER PUBLICATIONS

Japanese Office Action for corresponding JP2008-120107 issued on Apr. 27, 2010.

* cited by examiner

Primary Examiner — Patrick Assouad
Assistant Examiner — Steve T. Chung
(74) Attorney, Agent, or Firm — K&L Gates LLP

(57) ABSTRACT

A battery pack includes at least one secondary battery, a fuse, and a control section. The fuse is configured to cut off charge or discharge current of the secondary battery upon detection of an abnormality of the secondary battery. The control section is configured to detect the abnormality of the secondary battery, and to perform a fusion-cutting process of fusion-cutting the fuse in accordance with the result of the detection. Upon detection of the abnormality, the control section measures a first potential being the potential of a subsequent stage of the fuse and a second potential being the potential of the secondary battery. If it is found from the result of the measurement that the first potential and the second potential are equal, the control section determines that the fuse has not been fusion-cut by the fusion-cutting process, and stops the fusion-cutting process.

5 Claims, 5 Drawing Sheets

BATTERY PACK AND CONTROL METHOD

CROSS REFERENCES TO RELATED APPLICATIONS

The present application claims priority to in Japanese Priority Patent Application JP 2008-120107 filed in the Japan Patent Office on May 2, 2008, the entire content of which is hereby incorporated by reference.

BACKGROUND

The present application relates to a battery pack and a control method thereof for detecting an abnormality in the battery pack.

In recent years, mobile electronic devices, such as a notebook PC (Personal Computer), a mobile phone, and a PDA (Personal Digital Assistant), have been widespread. As the power supply of the mobile electronic devices, a lithium-ion secondary battery having such advantages as high voltage, high energy density, and lightweight has been widely used.

A battery pack of a secondary battery normally includes a fuse called chemical fuse as a protective device which operates in the event of overcharge or overcurrent to the secondary battery. The chemical fuse is configured to include a fuse and a heater resistor. Due to the heat generated by current flowing into the heater resistor, the fuse is fusion-cut.

The battery pack as described above is configured such that, in an abnormal state such as overcharge and overcurrent, current is applied to the heater resistor of the chemical fuse to fusion-cut the fuse and stop the charge or discharge of the secondary battery. As used throughout the present application, the term fusion-cut or fusion-cutting refers to a fuse being heated and melted to cut off a charge or discharge current of a secondary battery.

With reference to FIG. 4, a configuration example of a related art battery pack 100 will now be described. A positive terminal 111 and a negative terminal 112 of the battery pack 100 are connected to a positive terminal and a negative terminal of an external electronic device or charger, respectively, to discharge or charge the battery pack 100. A secondary battery 102 is a lithium-ion secondary battery, for example, and includes one or a plurality of battery cells 115 connected in series and/or parallel.

An AFE (Analog Front End) 103 measures the respective voltages of the battery cells 115 of the secondary battery 102, and measures the magnitude and direction of current by using a current detection resistor 107. Then, the AFE 103 supplies the measured values to an MPU (Micro Processing Unit) 104. Further, on the basis of a command from the MPU 104 described later, the AFE 103 transmits a control signal to a switch circuit 105 to prevent overcharge or overdischarge.

The switch circuit 105 is configured to include a charge control FET (Field Effect Transistor) 116a and a discharge control FET 117a. If the battery voltage reaches an overcharge detection voltage, the switch circuit 105 is controlled to turn OFF the charge control FET 116a, to thereby prevent the flow of charge current. After the turn-OFF of the charge control FET 116a, only the discharge can occur via a parasitic diode 116b.

Further, if the battery voltage falls to an overdischarge detection voltage, the switch circuit 105 is controlled to turn OFF the discharge control FET 117a, to thereby prevent the flow of discharge current. After the turn-OFF of the discharge control FET 117a, only the charge can occur via a parasitic diode 117b.

A chemical fuse 106 is configured to include fuses 118 and a heater resistor 119, and is connected in series to the secondary battery 102. If overcurrent to the secondary battery 102 is detected, for example, the overcurrent directly flows into the fuses 118. As a result, the fuses 118 generate heat and are fusion-cut.

Further, if overcharge to the secondary battery 102 is detected, for example, a FET 108 is turned ON on the basis of the control by the MPU 104 described later. As a result, a path is formed through which current flows from the secondary battery 102 into the FET 108 via the fuses 118 and the heater resistor 119. Then, the current flows into the heater resistor 119, and the heater resistor 119 generates heat. Due to the heat from the heater resistor 119, the fuses 118 are fusion-cut.

On the basis of the voltage value of the secondary battery 102 and the current value supplied by the AFE 103, the MPU 104 supplies the AFE 103 with a command for controlling the switch circuit 105, if the voltage of any one of the battery cells 115 of the secondary battery 102 reaches the overcharge detection voltage or falls to or below the overdischarge detection voltage. Further, upon detection of an abnormality, the MPU 104 controls a gate signal of the FET 108 to turn ON the FET 108, and performs a fusion-cutting process on the chemical fuse 106.

Further, the MPU 104 includes a counter 110 to count the time from the start of the fusion-cutting process which starts upon turn-ON of the FET 108. The counter 110 is previously set with a time-out time, i.e., the completion time of the counting operation. At the set time-out time, the counting operation is completed.

If the fuses 118 are fusion-cut, the MPU 104 transmits a fusion-cut alarm, which indicates that the fuses 118 have been fusion-cut, to the electronic device connected to the battery pack 100, via communication terminals 113 and 114.

Subsequently, with reference to the flowchart of FIG. 5, description will be made of the flow of processing performed when an abnormality of the secondary battery 102 is detected in the related art battery pack 100. The following processing is assumed to be performed under the control of the MPU 104. Further, the following processing is assumed to be cyclically performed every predetermined time, e.g., every second.

At Step S101, upon detection of an abnormality such as overcharge or overcurrent to the secondary battery 102, for which the fusion-cutting of the fuses 118 is necessary, it is determined whether or not a fusion-cut condition of the fuses 118 has been met, or whether or not the fusion-cut alarm has been set. At the initial stage, the fusion-cut alarm is reset. If the fusion-cut condition has been met, or if the fusion-cut alarm has been set, it is determined that an abnormality of the secondary battery 102 has been detected, and the processing proceeds to Step S102. At Step S102, in accordance with the control signal transmitted from the AFE 103 on the basis of the command from the MPU 104, the charge control FET 116a and the discharge control FET 117a are brought into the OFF state.

At Step S103, whether or not the fusion-cut alarm has been set is determined. If it is determined that the fusion-cut alarm has been set, the processing proceeds to Step S104 to start a count-up operation of the counter 110.

Meanwhile, if it is determined at Step S103 that the fusion-cut alarm has not been set, the processing proceeds to Step S105. At Step S105, a fuse fusion-cutting process is started. Thus, the FET 108 is turned ON to apply current to the heater resistor 119 of the chemical fuse 106, and the count value of the counter 110 is initialized to start the counting operation. Further, the fusion-cut alarm is set and transmitted to the electronic device connected to the battery pack 100, via the communication terminals 113 and 114.

At Step S106, it is determined whether or not the count value of the counter 110 has reached the previously set time-out time. If the count value has reached the time-out time, the processing proceeds to Step S107. Then, the fuse fusion-cutting process is completed, and the counting operation by the counter 110 is completed. If the count value has not reached the time-out time at Step S106, the processing returns to Step S101.

Meanwhile, if the fusion-cut condition has not been met and the fusion-cut alarm has not been set at Step S101, the state of the secondary battery 102 is determined to be normal, and the processing returns to Step S101.

As described above, in the related art battery pack, the fuses are fusion-cut upon detection of an abnormality. Accordingly, it is possible to cut off the charge or discharge current of the secondary battery, and thus to prevent a dangerous state.

If the battery voltage or the capacity of the secondary battery is low in the battery pack as described above, however, it is difficult to apply sufficient current to the heater resistor. As a result, there arises a situation in which the temperature of the heat generated by the heater resistor does not reach a fuse fusion-cut temperature and thus the fuses fail to be fusion-cut.

Further, if the spatial distance between the fuses and the case of the battery pack is short in such a situation, the case of the battery pack may be fused. In general, the heat-resistance temperature of resin or the like used as the material of the case of the battery pack is approximately 80° C., which is lower than the fuse fusion-cut temperature, which is approximately 130° C. For this reason, there arises an issue of the dangerous state described above, which is caused by the continuation of a state in which the temperature of the fuses is higher than the heat-resistance temperature of the case of the battery pack and is lower than the fuse fusion-cut temperature.

Therefore, to address the above-described issues, Japanese Unexamined Patent Application Publication No. 2007-215310, for example, describes a control method of a battery pack, which performs a charging operation when the battery voltage or the battery capacity of a secondary battery is low, to thereby apply sufficient current to a heater resistor.

SUMMARY

According to the control method described in the above patent application publication, however, the charging operation is performed despite the abnormal state of the secondary battery. Therefore, there arises an issue of a load on the secondary battery and a resultant dangerous state.

It is therefore desirable to provide a battery pack and a control method thereof for detecting the fusion-cut state of a fuse and thus preventing a dangerous state.

To address the above-described issues, a battery pack according to a first embodiment includes: at least one secondary battery; a fuse configured to cut off charge or discharge current of the secondary battery upon detection of an abnormality of the secondary battery; and a control section configured to detect the abnormality of the secondary battery, and to perform a fusion-cutting process of fusion-cutting the fuse in accordance with the result of the detection. Upon detection of the abnormality, the control section measures a first potential being the potential of a subsequent stage of the fuse and a second potential being the potential of the secondary battery. If it is found from the result of the measurement that the first potential and the second potential are equal, the control section determines that the fuse has not been fusion-cut by the fusion-cutting process, and stops the fusion-cutting process.

Further, a control method of a battery pack according to a second embodiment includes the steps of: detecting an abnormality of at least one secondary battery, and performing a fusion-cutting process of fusion-cutting a fuse which cuts off charge or discharge current of the secondary battery, in accordance with the result of the detection, measuring, upon detection of the abnormality, a first potential being the potential of a sequential stage of the fuse and a second potential being the potential of the secondary battery; and determining that the fuse has not been fusion-cut, if it is found from the result of the measurement that the first potential and the second potential are equal, and stopping the fusion-cutting process.

As described above, in the first and second embodiments, an abnormality of the secondary battery is detected. Then, in accordance with the result of the detection, the fusion-cutting process is performed which fusion-cuts the fuse which cuts off the charge or discharge current of the at least one secondary battery. Further, upon detection of the abnormality, the first potential being the potential of the subsequent stage of the fuse and the second potential being the potential of the secondary battery are measured. Then, if it is found from the result of the measurement that the first potential and the second potential are equal, it is determined that the fuse has not been fusion-cut by the fusion-cutting process. Accordingly, the fusion-cut state of the fuse can be reliably detected.

The embodiments detect an abnormality of the secondary battery, perform the fusion-cutting process of fusion-cutting the fuse which cuts off the charge or discharge current, and measure the first potential being the potential of the subsequent stage of the fuse and the second potential being the potential of the secondary battery. Then, if it is found from the result of the measurement that the first potential and the second potential are equal, the embodiments determine that the fuse has not been fusion-cut by the fusion-cutting process, and stop the fusion-cutting process. Accordingly, the embodiments have an effect of reliably detecting the fusion-cut state of the fuse and preventing the dangerous state in which the case of the battery pack is fused.

Additional features and advantages are described herein, and will be apparent from the following Detailed Description and the figures.

DETAILED DESCRIPTION

The present application will be described below with reference to the drawings according to an embodiment. In an embodiment, if a secondary battery is in an abnormal state, a fusion-cutting process is performed on a fuse which is a protective device provided to a battery pack. Then, whether or not the fuse has been unfailingly fusion-cut is detected. If the fuse has not been fusion-cut, information indicating that the fuse has not been fusion-cut is transmitted to an external electronic device connected to the battery pack to prevent the use of the battery pack.

Figure 1:
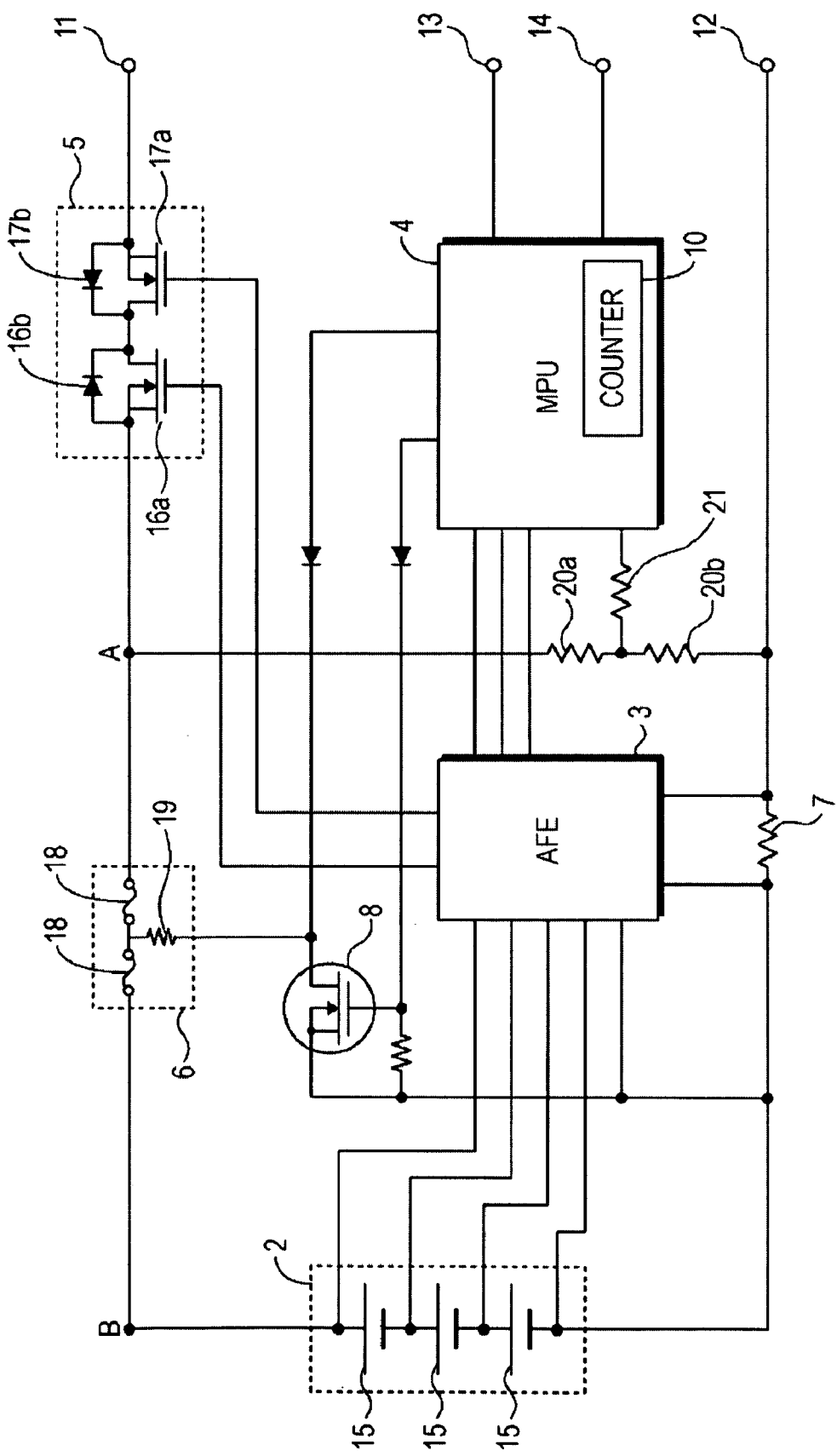
FIG. 1 is a block diagram illustrating a configuration example of a battery pack applicable to an embodiment.

FIG. 1 illustrates a configuration example of a battery pack 1 applicable to the embodiment. In the use of the electronic device, a positive terminal 11 and a negative terminal 12 of the battery pack 1 are connected to a positive terminal and a negative terminal of the external electronic device, respectively, to discharge the battery pack 1. Meanwhile, in the charging process, the battery pack 1 is attached to a charger, with the positive terminal 11 and the negative terminal 12 connected to a positive terminal and a negative terminal of the charger, respectively, in a similar manner as in the use of the electronic device to charge the battery pack 1.

The battery pack 1 is configured to mainly include a secondary battery 2, an AFE (Analog Front End) 3, an MPU (Micro Processing Unit) 4, a switch circuit 5, a chemical fuse 6, a current detection resistor 7, a FET (Field Effect Transistor) 8, and communication terminals 13 and 14. The secondary battery 2 is a lithium-ion secondary battery, for example, and includes one or a plurality of battery cells 15 connected in series and/or parallel. The present example illustrates a configuration in which three battery cells 15 are connected in series.

The AFE 3 measures the respective voltages of the battery cells 15 of the secondary battery 2, and supplies the measured values to the MPU 4 described later. Further, the AFE 3 measures the magnitude and direction of current by using the current detection resistor 7, and supplies the measured values to the MPU 4. The respective measurements are periodically performed every predetermined time.

The AFE 3 transmits a control signal to the switch circuit 5 on the basis of a command from the MPU 4 described later, to thereby prevent overcharge or overdischarge. Herein, if the secondary battery 2 is a lithium-ion battery, the overcharge detection voltage and the overdischarge detection voltage are set to be 4.25V±0.05V and 2.5V±0.1V, respectively, for example.

Further, the AFE 3 includes a regulator to convert the electricity supplied by the secondary battery 2 into electricity suitable for operating the MPU 4, and supplies the converted electricity to the MPU 4.

The switch circuit 5 is configured to include a charge control FET 16a and a discharge control FET 17a. If the battery voltage reaches an overcharge detection voltage, the switch circuit 5 is controlled to turn OFF the charge control FET 16a on the basis of the control signal from the AFE 3, to thereby prevent the flow of charge current. After the turn-OFF of the charge control FET 16a, only the discharge can occur via a parasitic diode 16b.

Further, if the battery voltage falls to an overdischarge detection voltage, the switch circuit 5 is controlled to turn OFF the discharge control FET 17a on the basis of the control signal from the AFE 3, to thereby prevent the flow of discharge current. After the turn-OFF of the discharge control FET 17a, only the charge can occur via a parasitic diode 17b.

The chemical fuse 6 is configured to include fuses 18 and a heater resistor 19, and is connected in series to the secondary battery 2. If overcurrent to the secondary battery 2 is detected, for example, the overcurrent directly flows into the fuses 18. Due to the current, the fuses 18 generate heat and are fusion-cut. As a result, a charge or discharge path to the secondary battery 2 is cut off.

Further, if overcharge to the secondary battery 2 is detected, for example, the FET 8 is turned ON on the basis of the control by the MPU 4 described later. As a result, a path is formed through which current flows from the secondary battery 2 into the FET 8 via the fuses 18 and the heater resistor 19. Then, the current flows into the heater resistor 19, and the heater resistor 19 generates heat. Due to the heat from the heater resistor 19, the temperature of the fuses 18 is increased. If the temperature reaches a fusion-cut temperature, the fuses 18 are fusion-cut, and the charge or discharge path to the secondary battery 2 is cut off.

On the basis of the voltage value of the secondary battery 2 and the current value supplied by the AFE 3, the MPU 4 detects an abnormality of the secondary battery 2. On the basis of the voltage value and the current value supplied by the AFE 3, the MPU 4 supplies the AFE 3 with a command for controlling the switch circuit 5, if the voltage of any one of the battery cells 15 of the secondary battery 2 reaches the overcharge detection voltage or falls to or below the overdischarge detection voltage.

Further, upon detection of an abnormality, the MPU 4 controls a gate signal of the FET 8 to turn ON the FET 8, and performs the fusion-cutting process on the chemical fuse 6. During the fusion-cutting process on the chemical fuse 6, the MPU 4 measures the potential between the switch circuit 5 and the chemical fuse 6 (the potential at a point A illustrated in FIG. 1). Then, on the basis of the potential measured at the point A and the potential of the secondary battery 2 measured by the AFE 3 (the potential at a point B illustrated in FIG. 1), the MPU 4 determines the fusion-cut state of the fuses 18.

If the voltage at the point A is directly supplied to the MPU 4, the MPU 4 may fail to operate properly. Therefore, the voltage at the point A is divided by resistors 20a and 20b and then supplied to the MPU 4, with the current regulated by a resistor 21.

The MPU 4 includes a counter 10 to count the time from the start of the fusion-cutting process which starts upon turn-ON of the FET 8. The counter 10 is previously set with a time-out time, i.e., the completion time of the counting operation. At the set time-out time, the counting operation is completed. A time necessary for the fusion-cutting of the fuses 18, for example, is set as the time-out time.

If the fuses 18 are fusion-cut, the MPU 4 transmits a fusion-cut alarm, which indicates that the fuses 18 have been fusion-cut, to the electronic device connected to the battery pack 1, via the communication terminals 13 and 14. Further, if the fuses 18 fail to be fusion-cut, the MPU 4 transmits a fusion-cut failure alarm, which indicates that the fuses 18 have failed to be fusion-cut, to the electronic device.

When attached to the electronic device, such as a PC, the communication terminals 13 and 14 send the electronic device a variety of information, such as information indicating an abnormality of the battery pack 1, on the basis of a predetermined communication standard. For example, the SMBus (System Management Bus) standard used mainly for power supply management can be used as the communication standard.

In the configuration described above, the AFE 3 and the MPU 4 are independent of each other. However, the configuration is not limited to the above example. For example, the AFE 3 and the MPU 4 may be configured to be integrated with each other.

Figure 2:
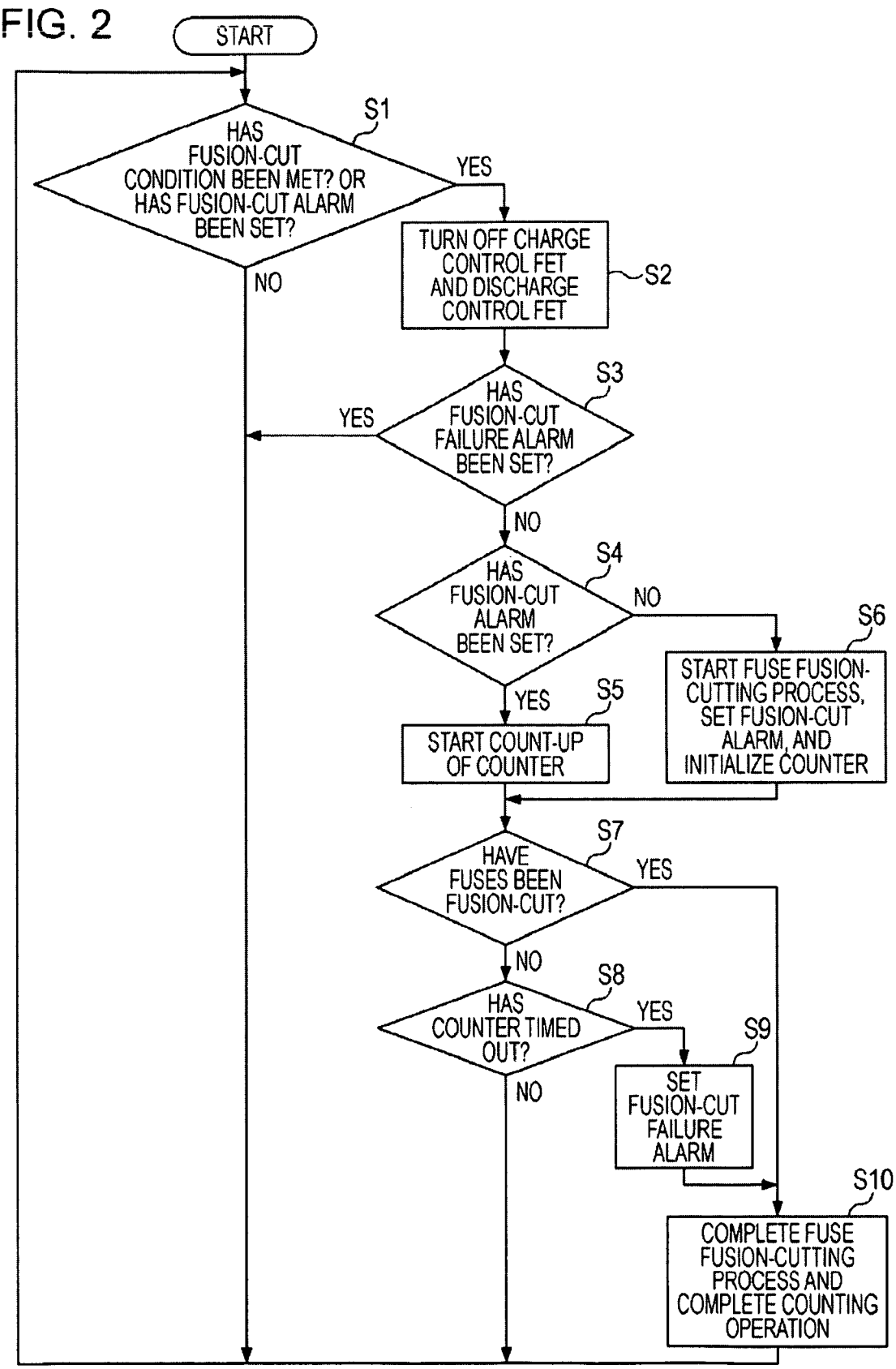
FIG. 2 is a flowchart for explaining the flow of processing performed when an abnormality of a secondary battery is detected.

Subsequently, with reference to the flowchart illustrated in FIG. 2, description will be made of the flow of processing performed when an abnormality of the secondary battery 2 is detected. The following processing is assumed to be performed under the control of the MPU 4, unless otherwise specified. Further, the following processing is assumed to be cyclically performed every predetermined time, e.g., every second.

At Step S1, upon detection of an abnormality such as overcharge or overcurrent to the secondary battery 2, for which the fusion-cutting of the fuses 18 is necessary, it is determined whether or not a fusion-cut condition of the fuses 18 has been met, or whether or not the fusion-cut alarm has been set. At the initial stage, the fusion-cut alarm is reset. If the fusion-cut condition has been met, or if the fusion-cut alarm has been set, it is determined that an abnormality of the secondary battery 2 has been detected, and the processing proceeds to Step S2. At Step S2, in accordance with the control signal transmitted from the AFE 3 on the basis of the command from the MPU 4, the charge control FET 16a and the discharge control FET 17a are brought into the OFF state.

At Step S3, whether or not the fusion-cut failure alarm has been set is determined. At the initial stage, the fusion-cut failure alarm is reset. If it is determined that the fusion-cut failure alarm has not been set, the processing proceeds to Step S4. If the fusion-cut failure alarm has been set, the processing returns to Step S1.

At Step S4, whether or not the fusion-cut alarm has been set is determined. If it is determined that the fusion-cut alarm has been set, the processing proceeds to Step S5 to start a count-up operation of the counter 10.

Meanwhile, if it is determined at Step S4 that the fusion-cut alarm has not been set, the processing proceeds to Step S6. At Step S6, a fuse fusion-cutting process is started. Thus, the FET 8 is turned ON to apply current to the heater resistor 19 of the chemical fuse 6, and the count value of the counter 10 is initialized to start the counting operation. Further, the fusion-cut alarm is set and transmitted to the electronic device connected to the battery pack 1, via the communication terminals 13 and 14.

At Step S7, the potential between the switch circuit 5 and the chemical fuse 6 (the potential at the point A illustrated in FIG. 1) is measured. Then, on the basis of the potential measured at the point A and the potential of the secondary battery 2 (the potential at the point B illustrated in FIG. 1), whether or not the fuses 18 have been fusion-cut is determined. If the potential at the point A and the potential at the point B are equal, it is determined that the fuses 18 have not been fusion-cut, and the processing proceeds to Step S8. Meanwhile, if the potential at the point A and the potential at the point B are different, it is determined that the fuses 18 have been fusion-cut, and the processing proceeds to Step S10.

At Step S8, it is determined whether or not the count value of the counter 10 has reached the previously set time-out time. If the count value has reached the time-out time, the processing proceeds to Step S9 to set and transmit the fusion-cut failure alarm to the electronic device connected to the battery pack 1, via the communication terminals 13 and 14. Meanwhile, if the count value has not reached the time-out time, the processing returns to Step S1.

At Step S10, the fuse fusion-cutting process is completed. Further, the counting operation by the counter 10 is completed.

Meanwhile, if the fusion-cut condition has not been met and the fusion-cut alarm has not been set at Step S1, the state of the secondary battery 2 is determined to be normal, and the processing returns to Step S1.

As described above, in an embodiment, an abnormality of the secondary battery is detected. Further, when the fuses are fusion-cut, the potential of the secondary battery is compared with the potential of a subsequent stage of the fuses to determine whether or not the fuses have been fusion-cut. Then, if the fuses have not been fusion-cut, the fusion-cut failure alarm indicating that the fuses have failed to be fusion-cut is transmitted to the electronic device using the battery pack, to thereby inform that the battery pack is in a dangerous state. Accordingly, it is possible to prevent the battery pack from lapsing into a further dangerous state.

In the present example, an alarm is transmitted to the electronic device using the battery pack, as the method of informing the external device of the fusion-cut state of the fuses 18. However, the method is not limited thereto. Thus, the fusion-cut state of the fuses 18 may be informed of by the use of another method. For example, an LED (Light-Emitting Diode) or the like may be provided to the battery pack 1 to perform a display operation in which the LED automatically lights up or blinks in accordance with the fusion-cut state of the fuses 18.

Figure 3:
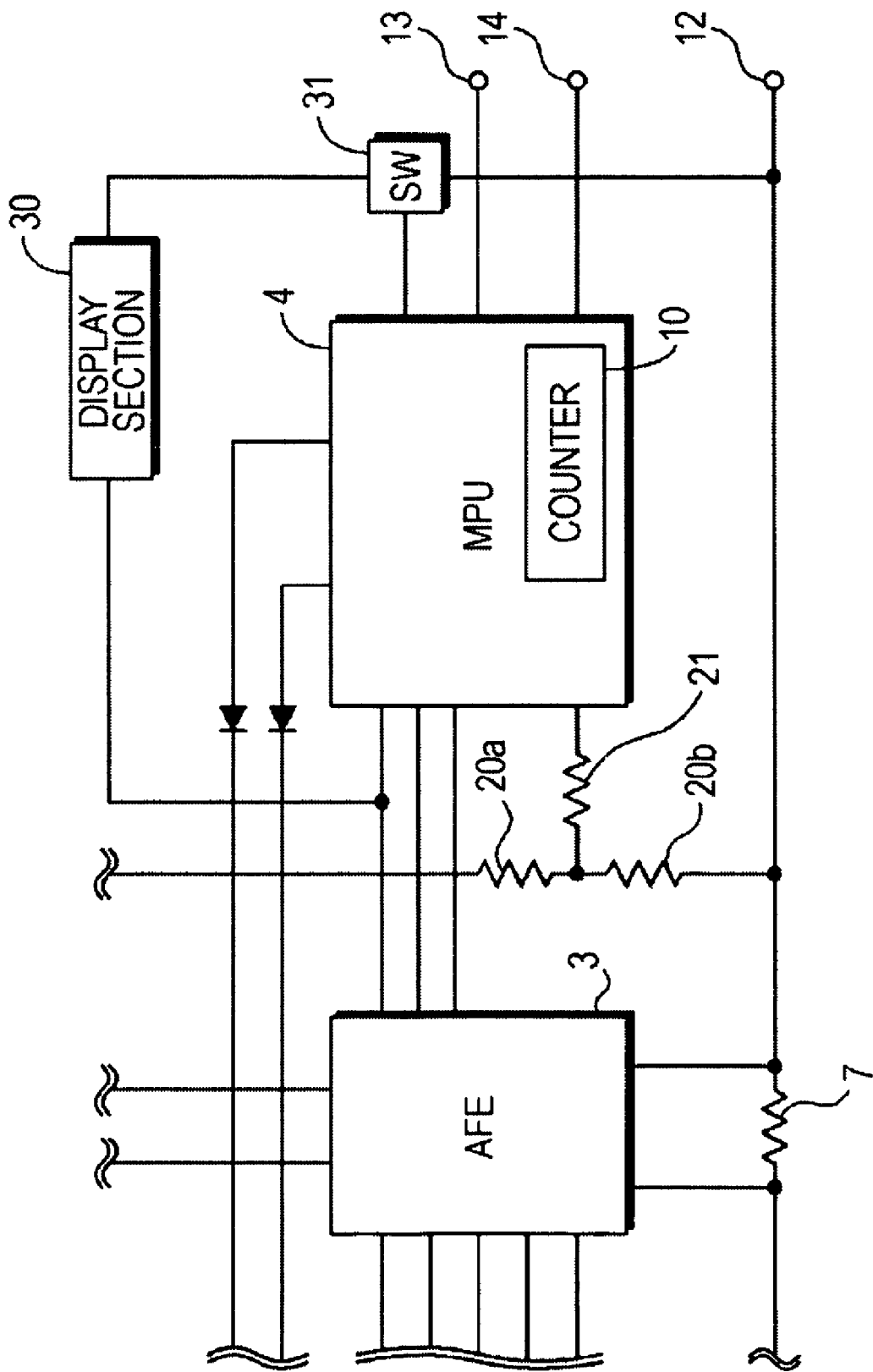
FIG. 3 is a block diagram for explaining a display operation performed when the abnormality of the secondary battery is detected.
Figure 4:
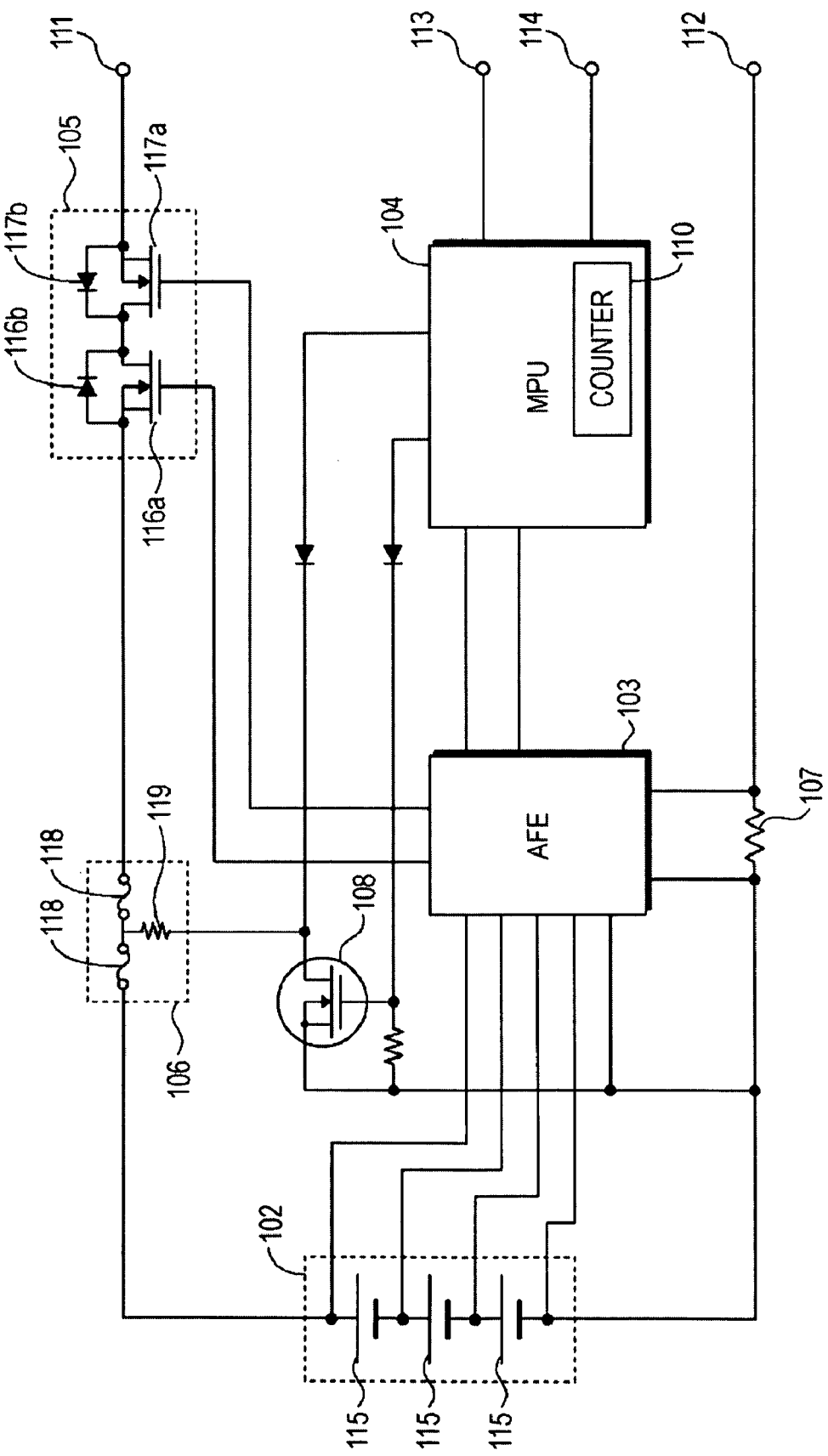
FIG. 4 is a block diagram illustrating a configuration example of a related art battery pack.
Figure 5:
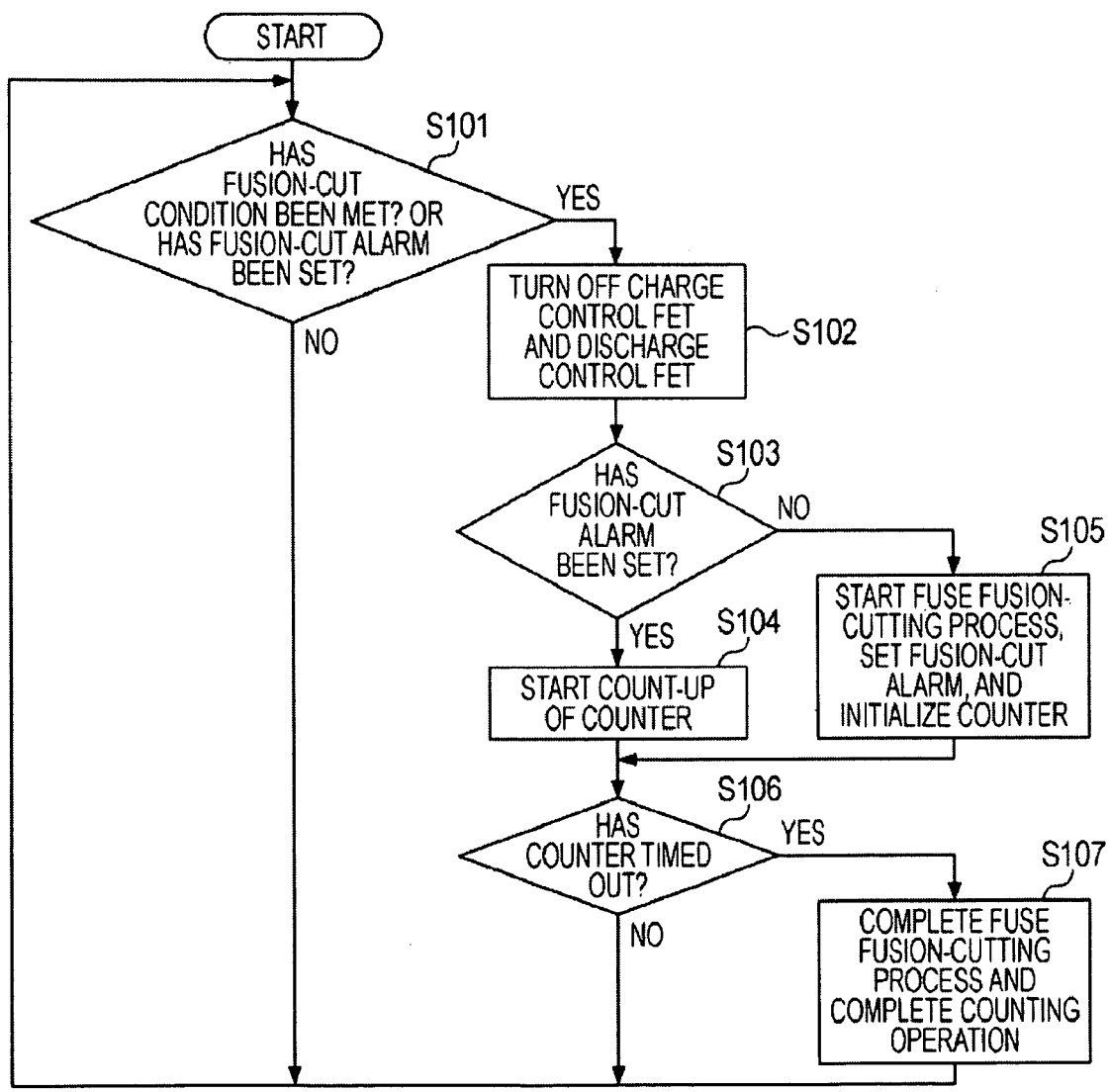
FIG. 5 is a flowchart for explaining the flow of processing performed when an abnormality is detected in the related art battery pack.

Specifically, for example, the battery pack 1 is provided with a switch 31 and a display section 30 formed by a light-emitting device such as an LED, as illustrated in FIG. 3. The display section 30 is connected to a power supply line extending from the AFE 3 to the MPU 4, and is connected to a negative line of the secondary battery 2 via the switch 31. When the switch 31 is turned ON, the LED of the display section 30 lights up or blinks.

The MPU 4 controls the switch 31. If it is determined that the fuses 18 have been fusion-cut, the MPU 4 controls the switch 31 to be turned ON. Upon turn-ON of the switch 31, the display section 30 and the negative line of the secondary battery 2 are electrically connected, and the LED lights up. Meanwhile, if it is determined that the fuses 18 have not been fusion-cut, the MPU 4 controls the switch 31 such that the ON and OFF states of the switch 31 alternate every predetermined time. As the ON and OFF states of the switch 31 alternate, the LED blinks.

By having the display section 30 automatically light up or blink in the above-described manner, it is possible to easily inform a user of the battery pack 1 of an abnormality of the battery pack 1.

Description has been made above of an embodiment. The present application, however, is not limited to the above-described embodiment of the present application, and thus can be modified or applied in a variety of ways. For example, the present application is not limited to the lithium-ion secondary battery. Thus, the present application is also applicable to a nickel-metal hydride secondary battery, a nickel-cadmium secondary battery, and so forth. In consideration of the degree of risk in an abnormal state, however, it is highly preferable to apply the present application to the lithium-ion secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
   at least one secondary battery;
   a fuse configured to cut off charge or discharge current of the secondary battery upon detection of an abnormality of the secondary battery; and
   a control section configured to detect the abnormality of the secondary battery, and to perform a fusion-cutting process of fusion-cutting the fuse in accordance with the result of the detection, wherein, upon detection of the abnormality, the control section measures a first potential being the potential of a subsequent stage of the fuse and a second potential being the potential of the secondary battery, and wherein, if it is found from the result of the measurement that the first potential and the second potential are equal, the control section determines that the fuse has not been fusion-cut by the fusion-cutting process, and stops the fusion-cutting process.

2. The battery pack according to claim 1, further comprising:

communication terminals configured to communicate with an external electronic device, wherein, if the fuse has not been fusion-cut, the control section transmits information indicating that the fuse has not been fusion-cut to the external electronic device via the communication terminals.

3. The battery pack according to claim 1, further comprising:

a display section configured to display the fusion-cut state of the fuse, wherein, if the fuse has been fusion-cut, the control section controls the display section to display that the fuse has been fusion-cut, and wherein, if the fuse has not been fusion-cut, the control section controls the display section to display that the fuse has not been fusion-cut.

4. The battery pack according to claim 3, wherein the display section is formed by a light-emitting device, and wherein the light-emitting device is lit up to display that the fuse has been fusion-cut, and is blinked to display that the fuse has not been fusion-cut.

5. A control method of a battery pack comprising:

detecting an abnormality of at least one secondary battery, and performing a fusion-cutting process of fusion-cutting a fuse which cuts off charge or discharge current of the secondary battery, in accordance with the result of the detection;

measuring, upon detection of the abnormality, a first potential being the potential of a sequential stage of the fuse and a second potential being the potential of the secondary battery; and determining that the fuse has not been fusion-cut, if it is found from the result of the measurement that the first potential and the second potential are equal, and stopping the fusion-cutting process.

* * * * *